UNITED STATES PATENT OFFICE.

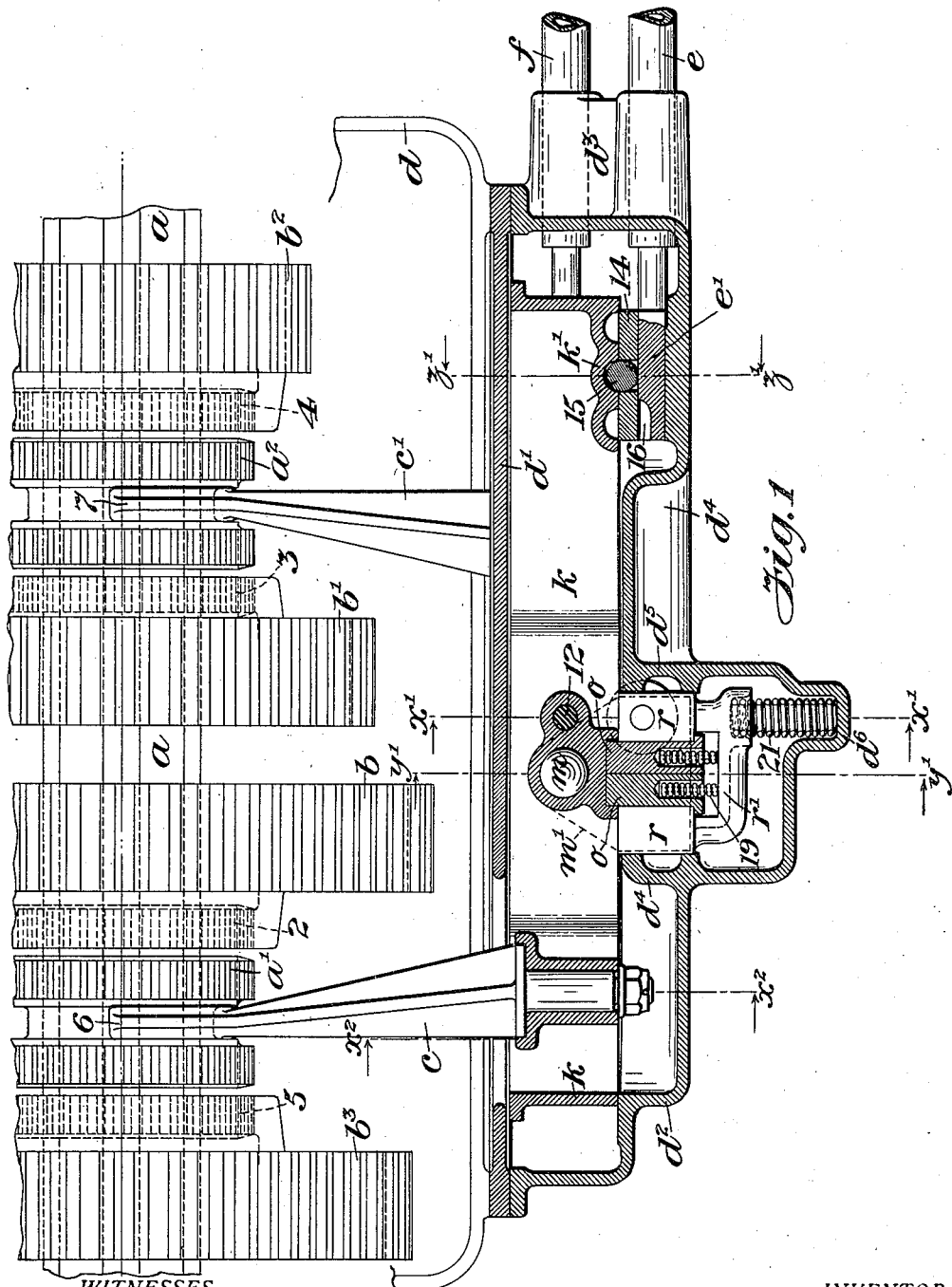

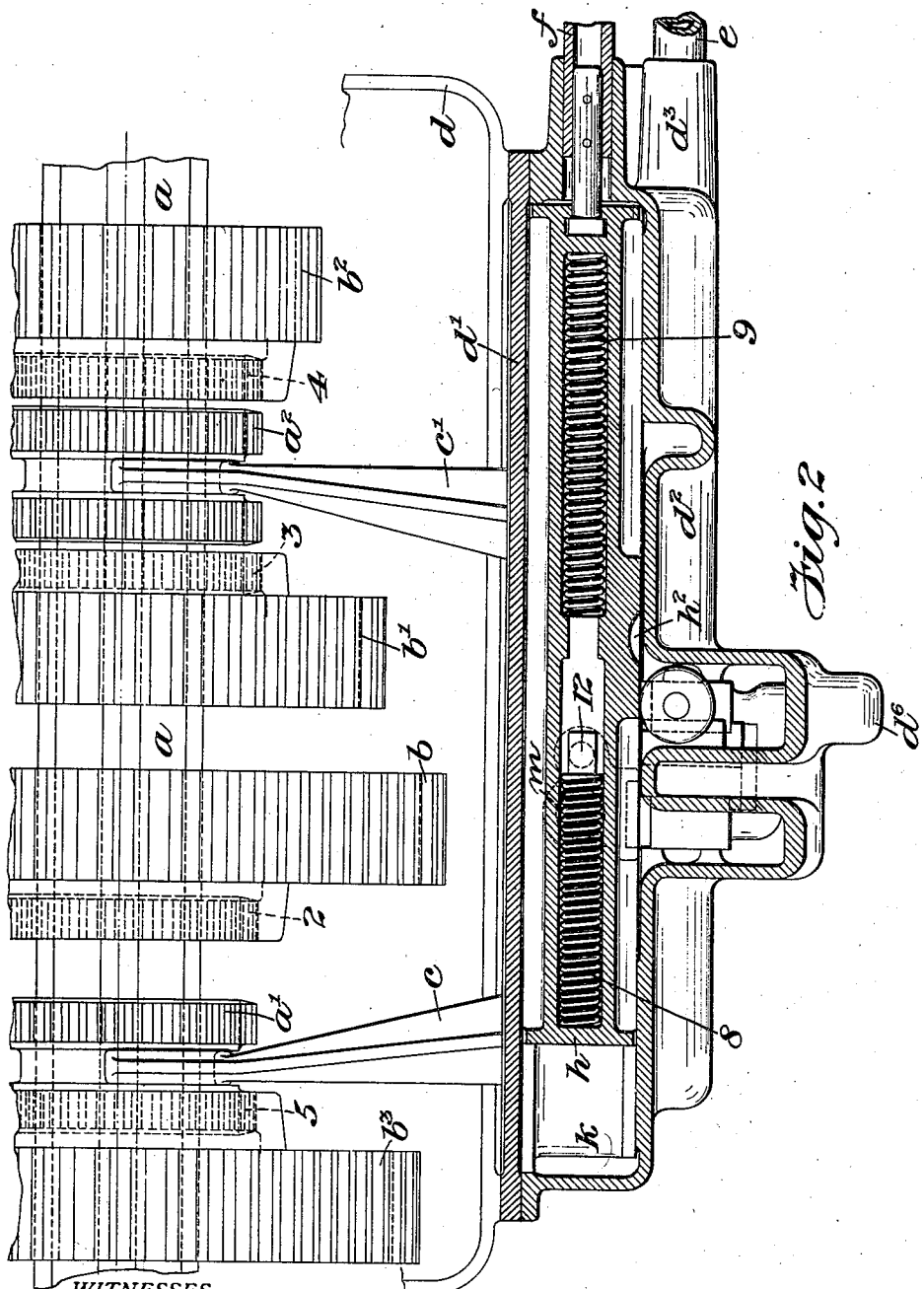

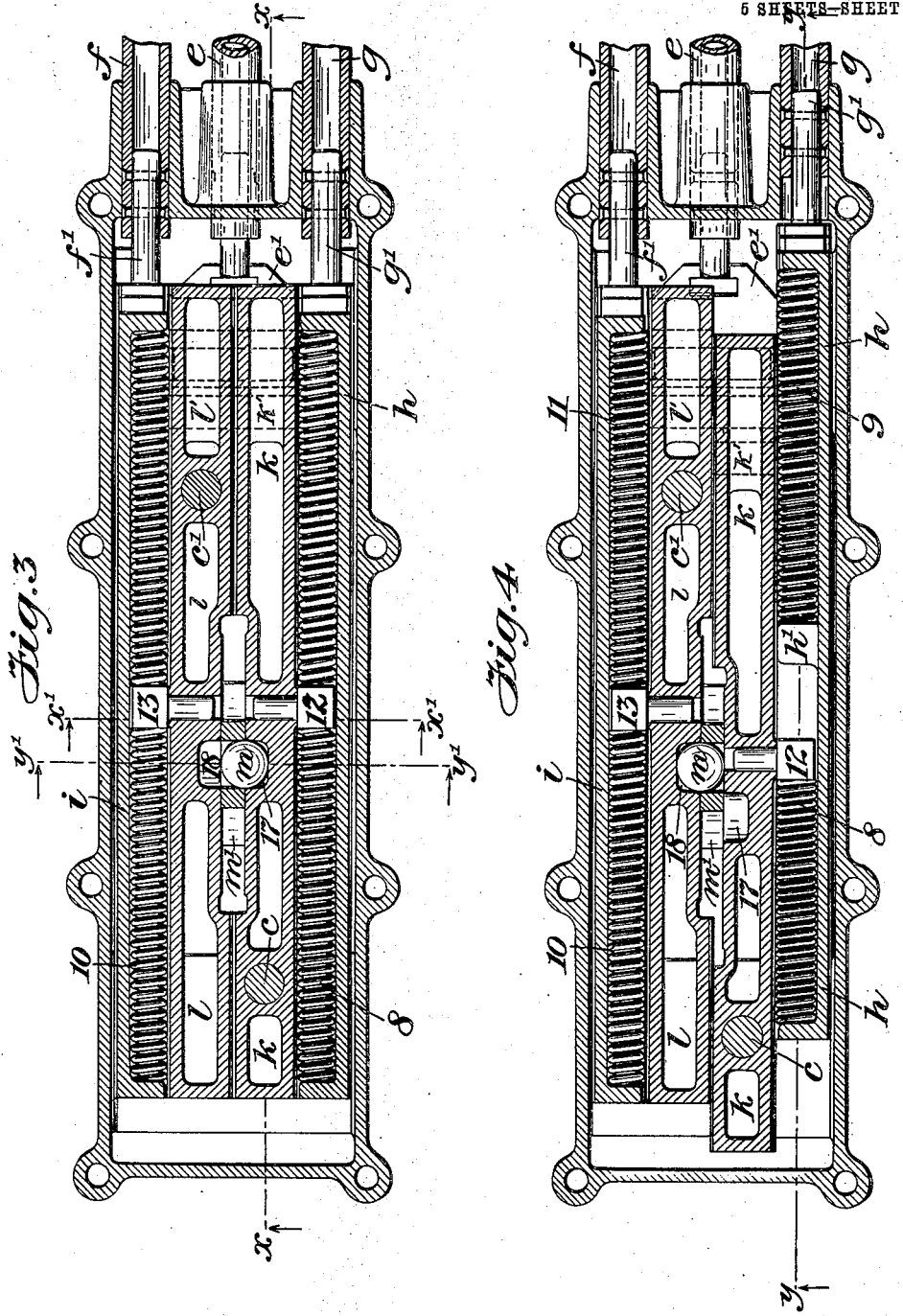

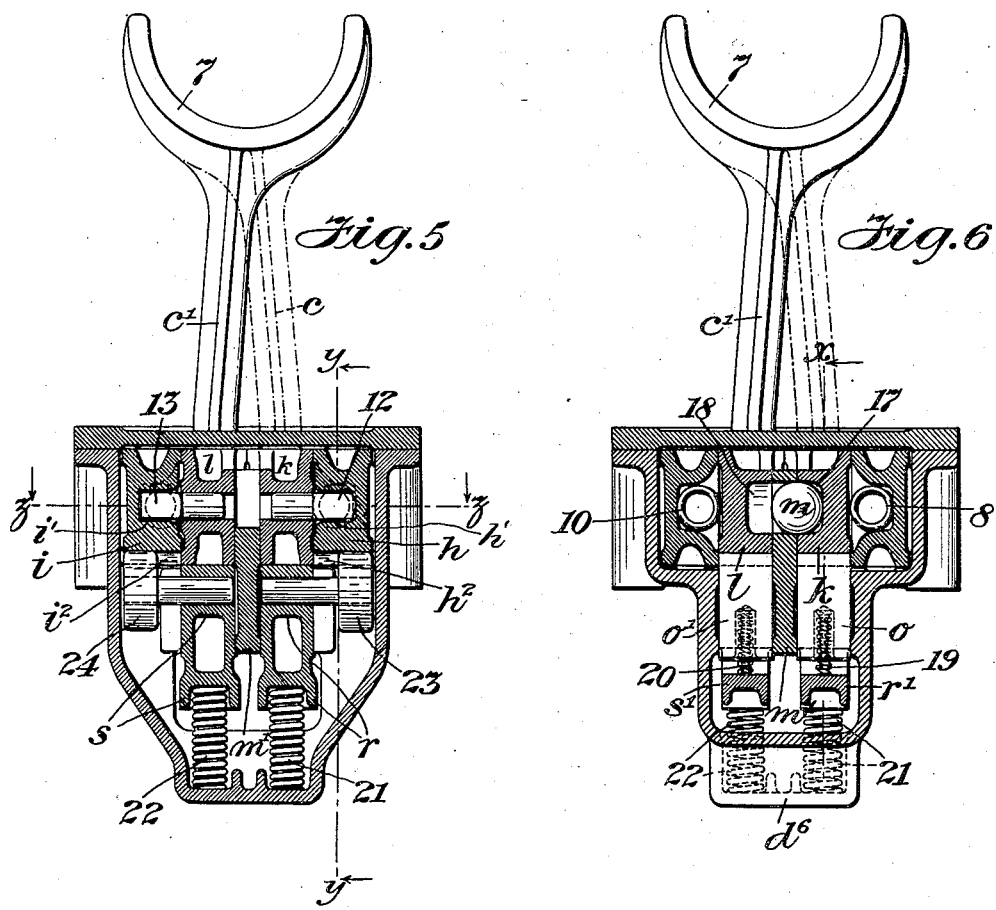

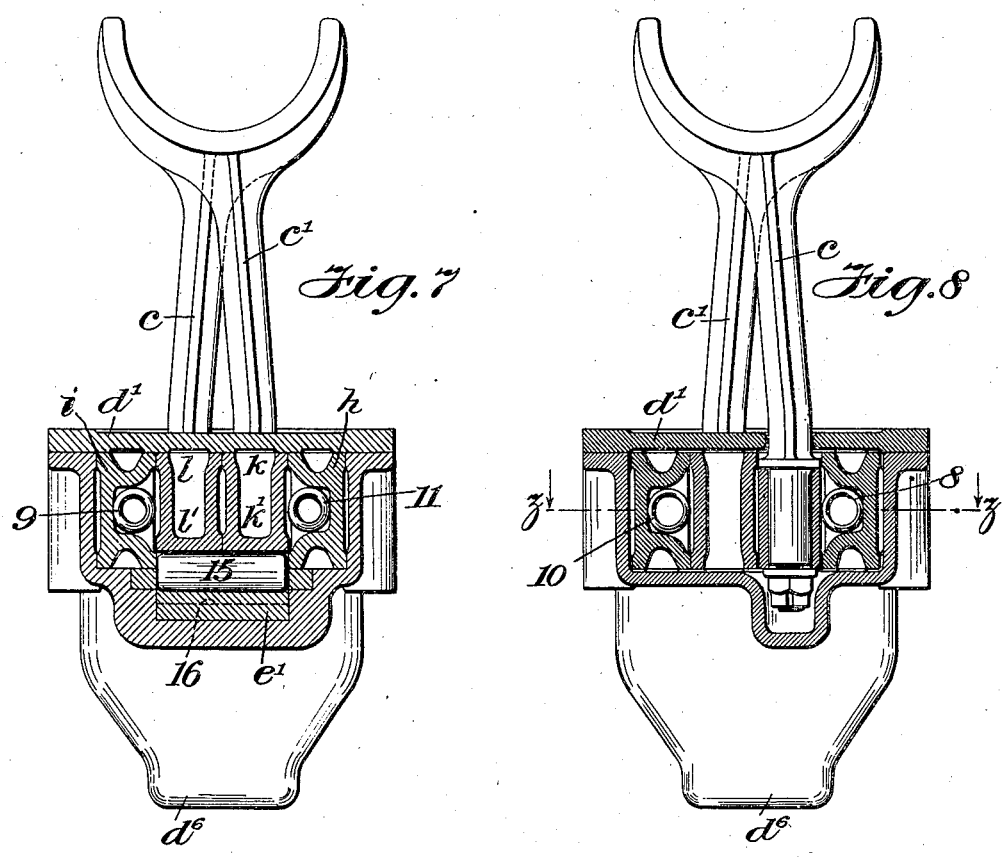

CLARENCE P. HOLLISTER, OF PITTSFIELD, MASSACHUSETTS, ASSIGNOR, BY DIRECT AND MESNE ASSIGNMENTS, TO REMINGTON STANDARD MOTOR COMPANY, OF NEW YORK, N. Y., A CORPORATION OF WEST VIRGINIA.

TRANSMISSION-CONTROLLING DEVICE.

1,095,575. Specification of Letters Patent. Patented May 5, 1914.

Application filed January 24, 1912. Serial No. 673,076.

*To all whom it may concern:*

Be it known that I, CLARENCE P. HOLLISTER, a citizen of the United States, residing at Pittsfield, in the county of Berkshire and State of Massachusetts, (whose post-office address is No. 407 West Fifty-seventh street, New York, N. Y.,) have invented certain new and useful Improvements in Transmission-Controlling Devices, of which the following is a specification.

My invention relates to an automatic transmission controlling device, or in other words, to an automatic device for shifting the transmission gears of a motor vehicle, with the object of simplifying the character and number of the mechanical operations to be performed by a motorman.

My invention is particularly adaptable to motor trucks, in connection with which the motorman is a person below the average mentality, and in many cases, quite ignorant and quite incapable of understanding mechanical devices, and with the device of my invention, he does not have to understand the same. My invention will probably not be useful for pleasure vehicles, as part of the pleasure of riding is in operating the mechanism.

In carrying out my invention, the character of the transmission is not important, nor the number of gears, but I prefer to employ several gears for speed forward and a reverse gear, and to employ clutch gears therefor, operated by gear shift arms and yokes to the clutch gears, the arms in turn being actuated by the devices of my invention.

In the device of my invention, the parts are all inclosed in a substantially fool-proof case, and extending therefrom. I employ three rods, two of which are advantageously coupled together and suitably actuated manually, the third rod actuating a release member, permitting the parts actuated to come into operation. Each of the two advantageously coupled rods are connected to a series of automatic spring actuated devices, and one or both of said rods may be actuated at a time, but the manually actuated devices may be so placed that the movement of the automatic spring actuated devices may quickly follow one another, disconnecting one set of gears and connecting another set, in changing speeds or in changing from a speed forward to a reverse. The other or third rod is actuated by devices controlling the motor clutch.

My invention also includes sliding carriages connected to the automatic spring actuated devices for their movement, said carriages having connected to them the gear shift arms and yokes, and I employ devices for holding and controlling both the movement and position of said carriages, and the parts connected therewith, all of which are hereinafter more particularly described.

In the drawing, Figure 1 is a longitudinal section and partial elevation of the device of my improvement, the section being on the broken lines $x$ $x$ of Figs. 3 and 6. Fig. 2 is a similar view to Fig. 1, except that the section is taken approximately on the broken lines $y$ $y$ of Figs. 4 and 5. Fig. 3 is a sectional plan through the parts inclosed by the substantially fool-proof case, the section being approximately on the broken lines $z$ $z$ of Figs. 5 and 8. Fig. 4 is a view similar to Fig. 3, illustrating one of the carriages and the gear shift arms in a position corresponding to Fig. 2 and connected with the reverse gear. Fig. 5 is a section transversely of the mechanism, approximately on the broken lines $x^1$ $x^1$ of Figs. 1 and 3. Fig. 6 is a transverse section, approximately on the broken lines $y^1$ $y^1$ of Figs. 1 and 3. Fig. 7 is a transverse section, approximately on the broken lines $z^1$ $z^1$ of Fig. 1. Fig. 8 is a transverse section, approximately on the broken lines $x^2$ $x^2$ of Fig. 1. Figs. 1 and 3 show the mechanism in a normal or neutral position in which the parts are locked.

Similar reference numerals and letters indicate similar parts in all the drawings.

Referring particularly to Figs. 1 and 2, I have shown somewhat diagrammatically the clutch shaft $a$, the clutch members $a^1$ $a^2$, centrally grooved for the yokes 6—7 of the gear shift arms $c$ $c^1$. I have also shown speed gears $b$ $b^1$ and $b^2$ differing in size for different speeds, and a reverse gear $b^3$. These gears $b$ $b^1$, $b^2$ and $b^3$ are preferably loose upon the shaft $a$, while the clutch members $a^1$ $a^2$ are connected to the shaft by a spline as usual, along which they are adapted to move for engagement with the internal clutch members 2, 3, 4 and 5, which form opposing faces to the gears $b$ $b^1$, $b^2$ and $b^3$. $d$ generally indicates a case for these gears to exclude dust, heavy foreign particles and water.

$d^1$ and $d^2$ indicate generally the parts of the substantially fool-proof case connected to the bottom of the gear case and adapted to inclose the essential features of my invention. at one end of which is a guide head $d^3$.

$e$ is a rod, extending through a bearing in the guide head $d^3$ and connected to the friction clutch device of the motor. $f$ and $g$ are other rods, also passing through the guide head $d^3$ of said case, and which rods are advantageously coupled together, or coupled to a simultaneously actuated and manually operated device, which forms no essential part of my invention, and which may be associated with the steering wheel of the machine for its most successful operation. The rod $e$ is connected, at its inner end, to a release plate $e^1$, sliding over the inner surface of the bottom of the case $d^2$, and $f^1$ $g^1$ are internal rods connected to the rods $f$ and $g$ and at their inner ends connected to sliding spring cases $h$ $i$. The case $h$ contains the helical springs 8 and 9, and the case $i$ the helical springs 10 and 11, and about the center of these cases, there are shoulders $h^1$ and $i^1$, between the sides of which and the ends of the cases, these springs are held in position. The spaces formed within said cases, between these shoulders $h^1$ and $i^1$, provide for receiving the heads 12 and 13, or pins which project therefrom toward the center of the cases, and recesses $h^2$ and $i^2$ are provided in the bottom of these cases $h$ and $i$ underneath, as hereinafter more fully described.

$k$ and $l$ are carriages, located in the gear case, in parallel position and between the sliding spring cases $h$ $i$. These carriages are substantially alike, but reversed. The carriage $k$ is provided with a socket, and receives the base of the gear shift arm $c$, which is securely fastened thereto. The carriage $l$, in turn, and at the other end thereof, is provided with a socket and receives the base of the gear shift arm $c^1$, which is securely fastened thereto, the fastening means being clearly illustrated in Fig. 1, and for both arms is the same. Each carriage, at about the center, is provided with a transverse opening to receive the pin, which extends out laterally from the head 12, and the head 13, these heads coming between the helical springs and serving to compress the same, because they may move along through the sliding spring cases, but have no movement in the carriages.

$k^1$ and $l^1$ are foot plates at the forward and lower portions of the carriages $k$ $l$. They are each provided with three grooves of semi-circular configuration on the under surface, and are adapted to receive in any one of the grooves, a roller 15, which roller, as will appear from Fig. 7, is as long as the two carriages are wide, or substantially so. The inner end of the plate $e^1$ is provided with a recess at 16, and this roller 15, and a grooved frame plate 14 is located between the under surface of the foot plates $k^1$ $l^1$ and the upper surface of the plate $e^1$. The groove of the frame plate 14 receives the roller 15, said frame plate 14 being fixed in position, while the plate $e^1$ may move, or the foot plates $k^1$ $l^1$ move with the carriages $k$ $l$. If the plate $e^1$ is drawn forward so that the recess 16, at the end thereof, comes below the roller 15, this roller will drop into the recess, and instead of being in the recess of the plate 14, and in one of the grooves of the foot plate $k^1$, or $l^1$, or both, it then is only in the groove of the plate 14 and recess of the plate $e^1$; therefore the carriages $k$ $l$, or either of them, with their foot plates, are free, because in the position shown in Fig. 1, this roller 15 locks one or both of the carriages so that they may not move longitudinally.

I provide a locking ball $m$, and in the carriages $k$ $l$, ball recesses 17, 18. I further provide a ball plate $m^1$, which comes between the recessed adjacent faces of the carriages $k$ $l$, and while these carriages, at their respective ends, come into a sliding relation of contact, the central portions are recessed to receive this ball plate $m^1$. The ball $m$ always remains in the recess of this ball plate, and it may occupy either the position shown in Fig. 3 or the position shown in Fig. 4. In Fig. 3, the ball $m$ is in the recess of the ball plate, and in the recess 17 of the carriage $k$, while in Fig. 4, it is also in the recess of the ball plate, and in the recess 18, of the carriage $l$. This ball plate $m^1$ is fixed, as will appear from Fig. 1, in which it is shown located between the walls $d^4$ and $d^5$ of the depressed portion of the case $d^2$, therefore this ball plate and the ball also are locking devices, in Fig. 3, locking the carriage $k$, so as to prevent a longitudinal movement by virtue of the interposed ball $m$, and in Fig. 4 locking the carriage $l$ by virtue of the interposed ball $m$. $o$ and $o^1$, see Figs. 1 and 6, are locking blocks, in pairs, at either side of the ball plate $m^1$, and recessed in under-cut portions of the carriages $k$ and $l$. There are springs 19 and 20 in recesses in these locking blocks. Between the same walls $d^4$ and $d^5$, I provide locking yoke frames $r$ $r$ and $s$ $s$, in pairs, the pairs $r$ $s$ having cross bars $r^1$ $s^1$ and the springs 19 and 20 of the pairs of locking blocks $o$ $o^1$ rest upon the upper surfaces of these cross bars $r^1$ $s^1$, with the tendency to lift the pairs of locking blocks $o$ $o^1$. This, however, is prevented by the lower flanged edges of these locking blocks, which, as shown in Fig. 1, come beneath the lower inner edges of the locking yoke frames, said yoke frames thus having the function, when depressed, of carrying down with them the pairs of locking blocks $o$ $o^1$, it being possible, however, for said pairs of locking blocks $o$ $o^1$ to be depressed against their springs 19 and 20, to bring their upper surfaces into a parallel position with the upper surfaces of the locking yoke frames $r$ $s$. One member $r$ and one member $s$ is perforated, to form a bearing for the arbor of the rollers 23 and 24, and 21 and 22 are springs beneath the members of the locking yoke frames which carry said rollers, the upper ends of said springs 21, 22, being in recesses of the cross bars $r^1$ $s^1$, and their lower ends bearing on the bottom of the depressed portion $d^6$ of the case. The upper surfaces of the locking yoke frames $r$ $s$ underrun the lower edges of the carriages $k$ $l$ so that they cannot rise above this line, but may be depressed below it. In fact, Fig. 2 shows these locking yoke frames, or one of them, depressed, because one of the rollers 23 or 24 is resting against the under surface of the sliding spring case $h$, instead of being in the recess $h^2$ of said case, and comparing Fig. 2 with Fig. 4, it will be noticed that so far as the locking ball $m$, and the locking blocks $o$ are concerned, that the spring case $h$ and the carriage $k$ are free, and referring simultaneously to Fig. 2, it will be noticed that the gear shift arm $c$ is connected at its clutch member $a^1$ to the reverse gear $b^3$; hence to shift this member $a^1$ from the reverse gear $b^3$, and thereby bring it to the normal position Fig. 1, and the parts to normal, as in the position Fig. 3, it is necessary to move some locking part, and this locking part is the roller 15. This is released at once, when the rod $e$ is moved forward so as to bring its plate $e^1$ and recess 16 into the position where the roller 15 may drop into the recess 16 and out of one of the grooves in the foot plate $k^1$. At once, with this, the resiliency of the spring 8 is effective, and under pressure it simultaneously moves the sliding spring case $h$ and the carriage $k$ from the position shown in Fig. 4 to the position shown in Fig. 3, at the same time moving the clutch member $a^1$ from the position shown in Fig. 2, to the position shown in Fig. 1.

Regarding the operation, we will presume, with reference to Figs. 1 and 3, that it is desired to couple the clutch member $a^2$ with the speed gear $b^2$, the parts being in the neutral position of Figs. 1 and 3. This is accomplished by pulling upon the rod $f$ and moving along the sliding spring case $i$ to the right hand of Fig. 3, thereby compressing the helical spring 10, thereafter the rod $e$ is moved to the right hand as the motor clutch of the machine is released. This permits the roller 15 to drop into the recess 16 of the plate $e^1$, releasing the carriage $l$, and immediately the force of the helical spring 10 is exerted to move the carriage $l$ to the right hand, and with it, the gear shift arm $c^1$ and the clutch member $a^2$, causing the same to enter the internal gear 4 of the speed gear $b^2$ and thus utilizing this speed gear, and through it, driving the vehicle at the speed desired as soon as the motor clutch is again engaged. The disengagement of the motor clutch, at all times, moves the rod $e$ and the release plate $e^1$ to the right hand of Fig. 1, and in doing so, the roller 15 drops into its recess 16 in the plate $e^1$ and out of a groove of the foot plates $k^1$ $l^1$. This movement to the right of the spring case $i$, simultaneously and at once causes a depression of the roller 24, and, with it, of the locking yoke frame $s$, its cross bar $s^1$, the pair of locking blocks $o^1$, and their springs 20, whereby these parts are freed from the carriage $l$ and the carriage is held in position, with the gears in engagement, partly by the spring 10, but these parts remain in this position when the clutch is engaged and the parts $e$ and $e^1$, with the roller 15, return to the position Fig. 1, except that in such case, this roller 15 will be in the left hand recess of $l^1$.

As an illustration of the operation of the device of my invention, should the motorman wish to change the speed from the gear $b^2$ to the gear $b$, he does so before starting the vehicle or after releasing the motor clutch, by first pushing upon the rod $f$. This moves the case $i$ to the left of Figs. 3 and 4, applying tension to the spring 11 and causing the carriage $l$ by its tendency to move to bear against the ball $m$. The rod $g$ is then pulled upon moving the case $h$ to the position Fig. 4, and applying tension to the spring 8. If the motor clutch is in a position of disengagement or is then released, the spring 8 will force the carriage $k$ to the right of Fig. 4 and as the recess 17 comes into coincidence with the ball $m$, the same will move out of the recess 18 into the recess 17, releasing the carriage $l$. The initial movement of the case $i$ will depress the roller 24 and yoke frame $s$ and unlock the locking blocks $o^1$, releasing the carriage $l$. The same condition will be produced for the carriage $k$, both carriages being free to move automatically in shifting the clutch members as described, except that as the gear $b$ is engaged, the clutch member $a^2$ must come to neutral position as per Fig. 1. This is accomplished by the roller 24 entering the notch in the under side of the case $i$ and permitting the yoke frame $s$ to rise with the locking blocks $o^1$ which catch the moving carriage $l$ and hold the same. Thereafter the vehicle is started by engaging the motor clutch and moving the rod $e$ to the left as per Fig. 1, simultaneously locking the parts and holding the gears in position. Considering the parts in the position shown in Figs. 2 and 4, where the clutch member $a^1$ is in mesh with the internal clutch 5 of the reverse gear $b^3$, and the carriage $k$ is at its left hand position Fig. 4, the motorman has pulled on the rod $g$, moving the spring case $h$ into the position Fig. 4, where the spring 8 is under compression and where the carriage $k$ is held still, as in Fig. 1, by the roller 15. The motorman moves the rod $e$ and plate $e^1$ to the right, to disengage the motor clutch. This immediately, again, drops the roller 15 into the recess 16, at once freeing the carriage $k$ which moves forward into normal position, as shown in Fig. 3, carrying with it the gear shift arm $c$ and its clutch member $a^1$ out of engagement with the reverse gear and at once the normal position is found by the roller 23 coming into the other side recess $h^2$ on the under side of the case $h$, which permits the spring 21 to raise the yoke frame $r$ to the under side of the carriage, the locking blocks $o$ following, and at once coming into the notch provided therefor in the under surface of the carriage $k$, holding the same in the neutral position shown in Fig. 1, when the vehicle may be stopped by the usual brakes. Should the motorman, in addition to this release operation, desire to couple the clutch member $a^2$ with the speed gear $b^1$, so that the vehicle may start forward at once, this movement is effected by pushing upon the rod $f$, compressing the spring 11, so that its tension is exerted upon the headed pin 13, this condition being present at the same time when the clutch member $a^1$ is connected with the reverse gear $b^3$, the roller 15 being in the position Fig. 1, and the motor clutch engaged. Then, with the movement to the right hand of Figs. 3 and 4, of the rod $e$ and plate $e^1$, to open the motor clutch the roller 15 is dropped into the recess 16 and the parts at once shift automatically to start the vehicle. The usual brakes may be applied to stop the vehicle if the rod $f$ is not moved. Then, to again start the vehicle, the rod $e$ and plate $e^1$ are again moved to the left to engage the clutch device, and this movement lifts the roller 15 and the previous setting of the rods $f$ $g$ for locking the parts to prevent movement while the vehicle is in motion. The speed may be automatically, safely and instantaneously changed from high to low or vice versa while the machine is running by shifting the rods $f$ and $g$ and the parts connected therewith, then momentarily releasing the motor clutch to permit the parts to shift, as described, and then connecting the same again for the movement of the vehicle at the desired speed. From the foregoing description, it will be quite apparent that by the movement of the rod $g$, tension may be applied to the helical spring 8, or the spring 9, according to the movement of the rod, also that according to the movement of the rod $f$, tension may be applied to the helical spring 10 or 11, and that thereby, and with the movement of the spring cases, containing said springs, and the carriage adjacent thereto, the clutch member $a^1$ may be brought into engagement with the speed gear $b$ or the reverse gear $b^3$ or the clutch member $a^2$ brought into engagement with the internal gears and the speed gears $b^1$ or $b^2$ so as to accomplish the forward movement of the vehicle at one of the several speeds or the reversal thereof. Furthermore, from the foregoing description, it is quite evident that the motorman of the truck to be actuated by the automatic transmission controlling device of my invention only has two things to do. The first is to set the mechanism according to the forward speed or the reverse that is desired, and to operate the clutch for connecting said transmission mechanism to the motor or disconnecting the same therefrom.

I claim as my invention:

1. In a transmission controlling device, the combination with gears and clutch devices, of a plurality of actuating members, to which respectively the clutch devices are connected, a corresponding number of manually positioned devices, connections therefrom respectively to the said actuating members, and a unitary means for locking and holding the said actuating members in position and for unlocking and releasing the same to permit them to move independently of one another.

2. In a transmission controlling device the combination with gears and clutch devices, of a pair of actuating members to which respectively the clutch devices are connected, a pair of manually positioned devices, connections therefrom to the said actuating members, and a unitary means for locking and holding the actuating members in position and for unlocking and releasing the same to permit them to move independently of one another.

3. In a transmission controlling device the combination with gears and clutch devices, of a pair of actuating members to which respectively the clutch devices are connected, a pair of manually positioned devices, connections therefrom to the said actuating members, a unitary means for locking and holding the actuating members in position and for unlocking and releasing the same to permit them to move independently of one another, and a locking device for locking and holding either of the actuating members in position.

4. In a transmission controlling device the combination with gears and clutch devices, of a pair of actuating members to which respectively the clutch devices are connected, a pair of manually positioned devices, connections therefrom to the said actuating members, a unitary means for locking and holding the actuating members in position and for unlocking and releasing the same to permit them to move independently of one another, and a locking device for locking and holding either of the actuating members in position, and which is movable from one to the other with the movement of first one and then the other of said actuating devices.

5. In a transmission controlling device the combination with gears and clutch devices, of a pair of actuating members connected respectively to the said clutch devices, a pair of manually positioned devices, a pair of springs in each manually positioned device, a pin extending from each actuating member and lying between the adjacent ends of the springs in the adjacent manually positioned device, and a unitary means for locking and holding the actuating members in position and for unlocking and releasing the same to permit them to move independently of one another.

6. In a transmission controlling device the combination with gears and clutch devices, of a pair of actuating members connected respectively to the said clutch devices, a pair of manually positioned devices, a pair of springs in each manually positioned device, a pin extending from each actuating member and lying between the adjacent ends of the springs in the adjacent manually positioned device, a rod, and a locking roller actuated by the movement of the said rod and adapted to engage both actuating members to lock the same in position.

7. In a transmission controlling device the combination with the gears, clutch devices and gear shift arms, of a pair of parallel actuating members to which the said gear shift arms are connected, a locking member located between said pair of actuating members, a support receiving said locking device, the said actuating members each being provided with a part adapted to receive and be engaged by said locking device, and the said actuating members being also provided at their forward ends with grooves in the under surface, transversely alining in a neutral position, a roller extending across the said pair of actuating members, and adapted to occupy the said grooves thereof, a grooved frame plate for said roller, and a device longitudinally movable beneath the said roller and frame plate and by the movement of which the roller is controlled to lock and release the said pair of actuating members.

8. In a transmission controlling device, the combination with the gears, clutch devices and gear shift arms, of a pair of parallel actuating members, to which the said gear shift arms are connected, a locking member located between said pair of actuating members, a support receiving said locking device, the said actuating members each being provided with a part adapted to receive and be engaged by said locking device, longitudinally movable devices at either side of the pair of actuating members, and connections between the said actuating members and said longitudinally movable devices, causing the actuating members to be moved in either direction by a corresponding movement of the said longitudinally movable members.

9. In a transmission controlling device, the combination with the gears, clutch devices and gear shift arms, of a pair of parallel actuating members, to which the said gear shift arms are connected, a locking member located between said pair of actuating members, a support receiving said locking device, the said actuating members each being provided with a part adapted to receive and be engaged by said locking device, each of said actuating members being recessed on the under side, locking blocks in pairs, locking yoke frames adapted to come beneath and to bear upon the under surface of said actuating members, and a roller connected with each locking yoke frame adapted to enter a recess in the under surface of the said actuating members when the same are in their normal positions.

10. In a transmission controlling device, and in combination, speed gears, clutch devices, gear shift arms, and traveling carriages occupying parallel positions for movement in opposite directions, and with which the gear shift arms are connected near the opposite ends, said carriages being in part recessed in opposition to one another and having depressed faces at the recesses, an apertured ball plate located between the depressed faces, a locking ball in said aperture adapted simultaneously to occupy the aperture in the ball plate and the recess in one of said carriages, a case surrounding the said parts and in its lower portion provided with walls for fixing the position of the ball plate, means for applying a spring tension to either or both of said carriages, means for simultaneously releasing both of said carriages, whereby one moves until its recess comes opposite to the locking ball, the pressure on the other at once forcing said locking ball to move from its recess in one carriage to the alining recess in the other carriage, so as to release the first aforesaid carriage for its movement.

11. In a transmission controlling device, and in combination, speed gears, clutch devices, gear shift arms, and traveling carriages occupying parallel positions for movement in opposite directions, and with which the gear shift arms are connected near the opposite ends, said carriages being in part recessed in opposition to one another and having depressed faces at the recesses, an apertured ball plate located between the depressed faces, a locking ball in said aperture adapted simultaneously to occupy the aperture in the ball plate and the recess in one of said carriages, a case surrounding the said parts and in its lower portion provided with walls for fixing the position of the ball plate, manually actuated devices at opposite sides of the said carriages, helical springs therein, devices connected to said carriages and extending into said manually actuated devices between the springs therein, whereby the movement of said manually actuated devices causes a spring tension to be exerted against either of the carriages, means for locking said carriages together, means for actuating the last aforesaid means, and devices located in said case and beneath said carriages for engaging the same in either direction to normally maintain them in their initial positions.

12. In a transmission controlling device, and in combination, a pair of longitudinally movable carriages, gear shift arms connected therewith at opposite ends, the said carriages being recessed in the under surface with correspondingly shouldered recesses, spring actuated locking blocks in pairs adapted to engage said recesses, locking yoke frames adapted to under-run said carriages and to act as supports for the locking blocks, springs for holding up the locking yoke frames, arbors in said yoke frames, rollers on said arbors, spring actuated sliding cases parallel with said carriages and coming outside of the same and adapted for movement in either direction, the said sliding cases being recessed on their under sides to receive said rollers, whereby said rollers engage said recesses and permit said locking blocks in pairs to engage the carriages for arresting the longitudinally movable parts in their normal positions.

13. In a transmission controlling device, and in combination, a pair of longitudinally movable carriages, gear shift arms connected thereto at opposite ends thereof, the said carriages thereof recessed in their under surfaces with correspondingly shouldered recesses, spring actuated locking blocks in pairs adapted to engage said recesses, locking yoke frames adapted to under-run said carriages and to act as supports for the locking blocks, springs for holding up the locking yoke frames adapted to under-run said carriages and to act as supports for the lockally positioned devices, each having a recess in its under surface adapted to receive one of the said rollers for arresting and holding it in a normal position.

Signed by me this 12th day of January 1912.

CLARENCE P. HOLLISTER.

Witnesses:
   GEO. T. PINCKNEY,
   J. B. LE BLANC.